United States Patent [19]
Payne, Jr.

[11] 3,776,462
[45] Dec. 4, 1973

[54] METAL SPRAYING APPARATUS

[76] Inventor: Paul H. Payne, Jr., 8512 Lee's Summit Rd., Kansas City, Mo. 64139

[22] Filed: Jan. 8, 1973

[21] Appl. No.: 321,652

[52] U.S. Cl........... 239/134, 219/421, 222/146 HE, 239/135, 239/346, 239/365
[51] Int. Cl............................................. B05b 1/24
[58] Field of Search.................. 239/79, 81, 82, 85, 239/132, 133–135, 296, 346, 364, 365, 424.5; 219/421; 222/146 HE

[56] References Cited
UNITED STATES PATENTS

| 1,792,551 | 2/1931 | Rice et al............................ 239/135 |
| 2,434,911 | 1/1948 | Denyssen........................... 239/79 X |
| 2,068,205 | 1/1937 | Steckel, Jr. et al................ 239/133 |
| 2,530,186 | 11/1950 | Trimm et al......................... 239/82 |
| 2,646,314 | 7/1953 | Peeps.................................. 239/296 |
| 2,795,461 | 6/1957 | Durkin..................... 222/146 HE X |

*Primary Examiner*—M. Henson Wood, Jr.
*Assistant Examiner*—Andres Kashnikow
*Attorney*—Claude A. Fishburn et al.

[57] ABSTRACT

An apparatus for melting and spraying molten fusible metals and metal alloys. The metal spraying apparatus is portable and includes an insulated container having heaters installed therein preferably at the bottom for heating metal contained in the container to a molten state. A spray head is mounted on the container and has an inlet tube extending to adjacent the bottom of the container near the heater. An air supply is connected to the spray head and furnishes heated air under pressure through a venturi at the tube connection to siphon the molten metal from the container and carry it to a spraying nozzle. A second heater is in the spraying head to heat a portion of the air from the air supply to have the air blast in the spraying head at a temperature of or above the melting point of the metal. The air blast siphons molten metal, atomizes same and propels the molten metal through the nozzle onto surfaces for adhesion therewith in the form of a coating.

10 Claims, 4 Drawing Figures

METAL SPRAYING APPARATUS

The principal objects of the present invention are: to provide a portable spraying apparatus having a container with heating elements to melt fusible metal therein and a spraying head on the container and subjected to the action of hot air under pressure to siphon molten metal from the container and atomize and propel the atomized particles or droplets at a high velocity onto a surface to be coated; to provide such an apparatus wherein a heater is arranged to direct the heat to the metal container and particularly the bottom thereof to melt and maintain the metal molten with a siphon tube inlet in the area of highest molten metal temperature; to provide such an apparatus with a siphon and venturi wherein pressurized hot air is directed through the venturi at high velocity to move molten metal from the container to the spraying head; to provide such an apparatus with a spraying head and nozzle with superheated air jets to maintain minute particles of atomized metal molten and aid in propelling same from the nozzle; to provide such an apparatus wherein the container and spraying head are provided with a handle or grip for manipulating same and air controls thereon for actuation by the operator; to provide such an apparatus with electric heaters as the heat source thereby eliminating the need for open flame heat sources; to provide such an apparatus with heat insulation for shielding the electric heaters and the container whereby the heat is concentrated in the container with a minimum of heat loss; to provide such an apparatus with a hot air supply that is divided into separate flow streams, one to siphon the molten metal from the container and the other flow stream having additional heat added thereto to atomize the siphoned molten metal whereby the hot air maintains the siphoned metal in a molten state; to provide such an apparatus wherein the heaters for melting the metal and for heating the air are separate whereby the temperatures of each can be separately controlled; to provide such a metal spraying apparatus with a seal for sealing the container preventing accidental spillage therefrom; to provide such an apparatus with means to equalize the pressure in the container with the pressure outside the container thereby allowing siphoning of the molten metal from the container; and to provide such a metal spraying apparatus that is suitable for its intended use, compact in construction, readily manipulated by an operator, having a minimum number of parts, sturdy in construction and safe in operation.

Other objects and advantages of the present invention will become apparent from the following description taken in connection with the accompanying drawings wherein are set forth by way of illustration and example certain embodiments of this invention.

Figure 1:
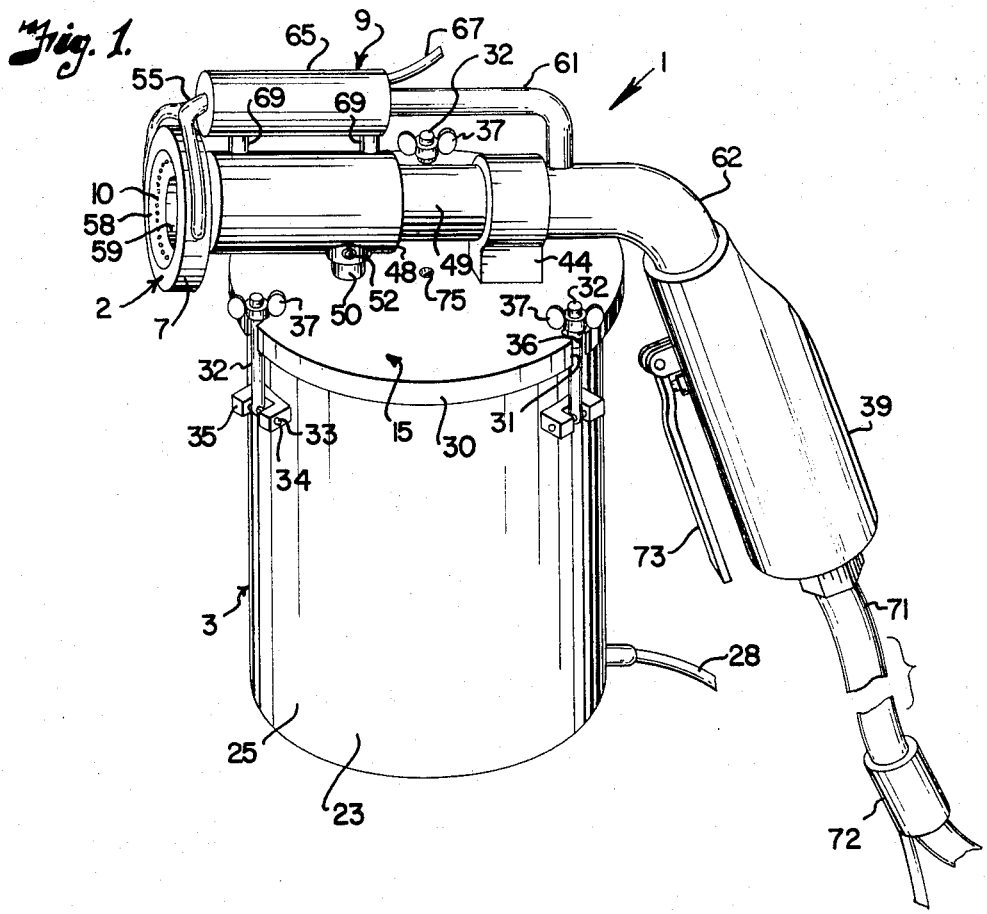
FIG. 1 is a perspective view of a metal spraying apparatus.
Figure 2:
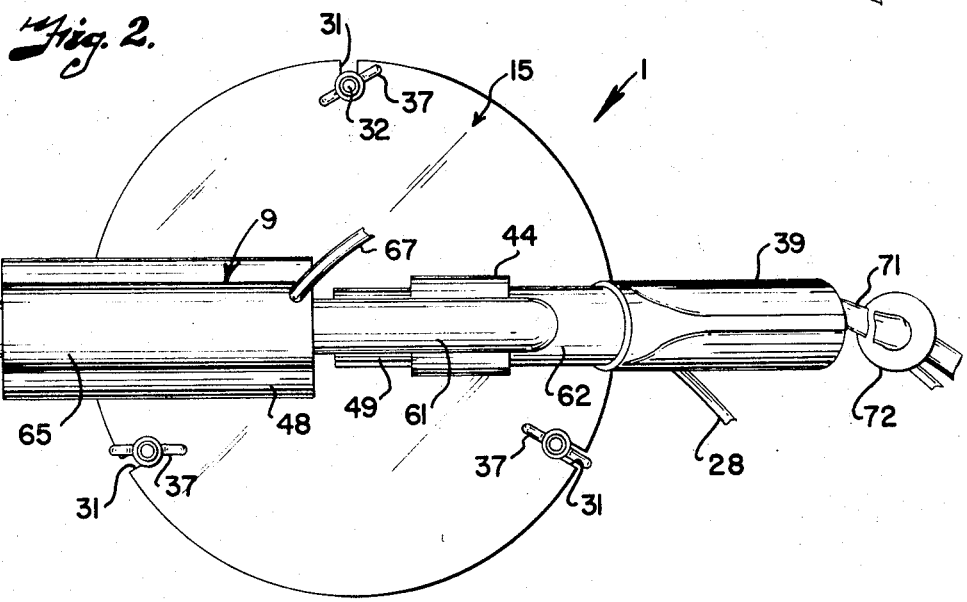
FIG. 2 is a plan view of the metal spraying apparatus.
Figure 3:
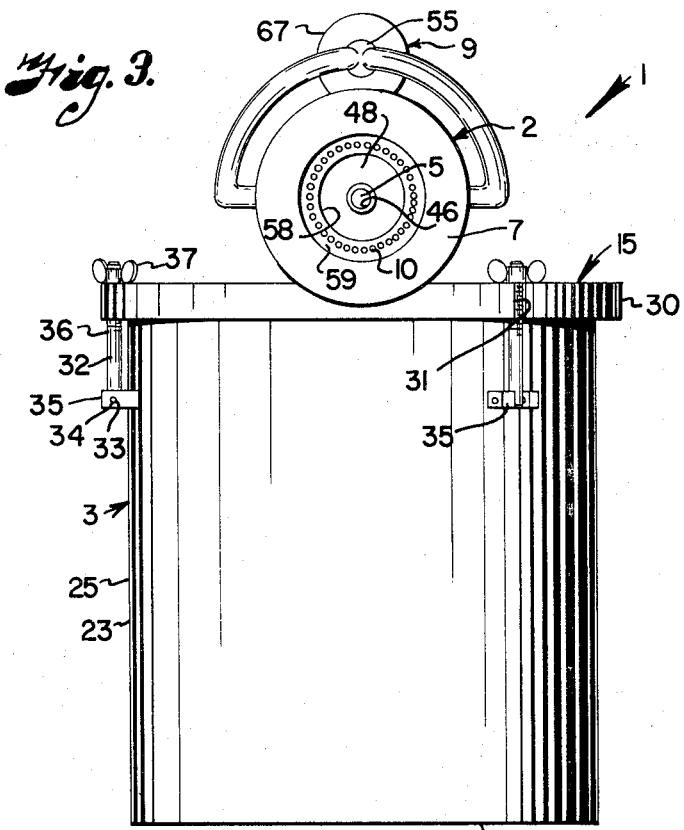
FIG. 3 is a front elevational view of the metal spraying apparatus.
Figure 4:
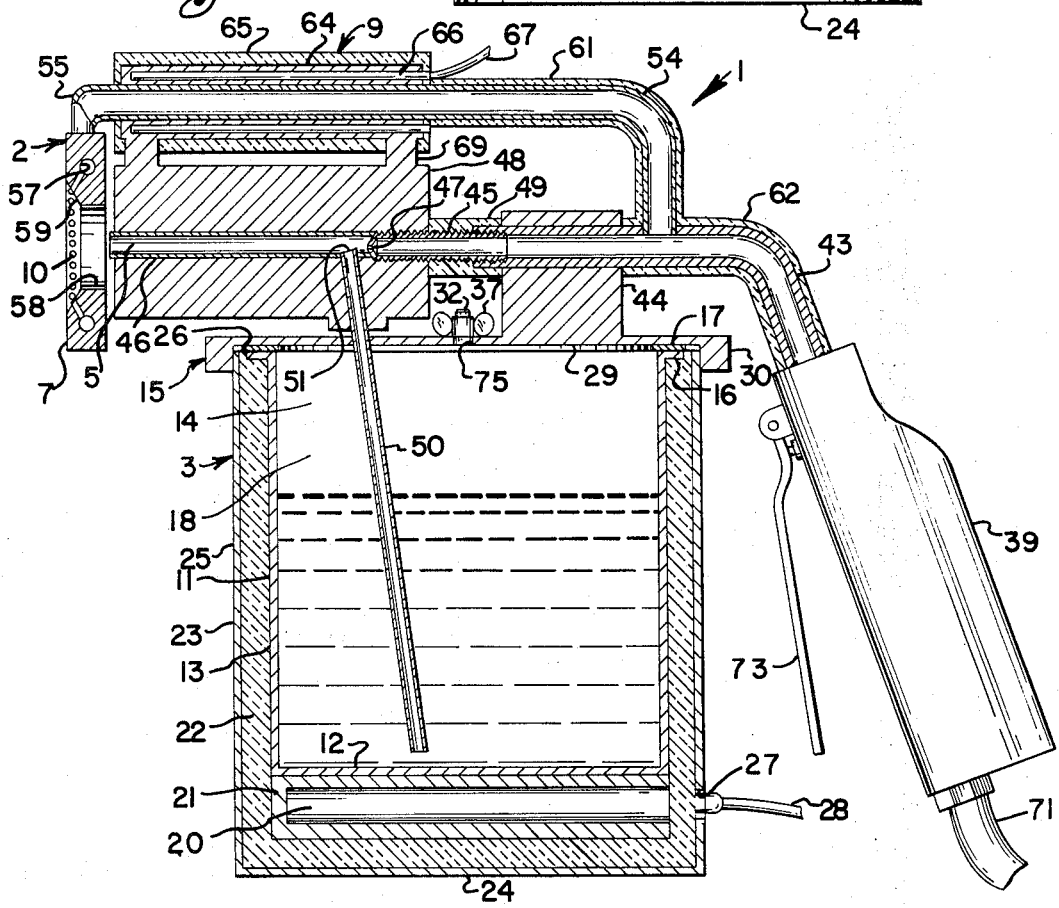
FIG. 4 is a side elevation view sectioned along the line 4—4 to show structural details thereof.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

A metal spraying apparatus designated generally by the reference numeral 1 uses hot air delivered to a spray head 2 to siphon molten metal alloy from a container 3 and propel same through a passage 5 to a spraying nozzle 7. Air flows through a heater 9, and is super-heated and is thereafter directed into the spraying nozzle 7 and out spray orifices or jets 10 with high velocity to futher atomize the molten metal and to propel same onto a surface that is to be coated with the alloy.

In the illustrated structure the container 3 includes an elongate vessel 11 having a bottom wall 12, side wall 13 and an open top 14 adapted to be closed by a cover 15 which is part of the spray head 2. The vessel preferably has an annular flange 16 at its upper end seating a seal ring or gasket 17 which is compressed between the cover 15 and flange 16 to seal the open top 14 and define a chamber 18 in the vessel 11 for containing metal to be melted and sprayed as later described. The vessel walls are of a suitable metal to withstand heat and be inert to the metal or alloy to be melted, for example, stainless steel and the like.

The vessel 11 is suitably heated to melt the metal to be sprayed and is insulated to hold the heat in the vessel and prevent heat loss. In the structure illustrated one or more electric heaters 20 of an electrically insulated rod type are positioned in a receiver 21 formed of material having high heat conductance and the receiver 21 is secured in heat conducting contact with the vessel wall for heating metal in the chamber 18. The heater receiver 21 may be formed of copper and is of a size to contact substantially the bottom wall 12. Heat insulation 22 surrounds the vessel walls and the receiver 21 and is illustrated as a suitable layer covering the sides 13 of the vessel 11 from the flange 16 and extending under the receiver 21. An outer shell 23 encloses the insulation to hold same in place, said shell 23 having a bottom 24 and side wall 25 with the upper portion of said side wall 25 separated from the flange 16 by insulation as at 26 to prevent heat transfer therebetween. The shell 23 has suitable openings 27 for electrical connection to the heater elements 20 as with a conductor 28 being shown as connected to said heater element 20 and extending to a suitable source of electrical current.

The spray head 2 includes a container cover 15 which is removably mounted on the container 3 and when secured thereto closes the open upper end of the vessel 11. The cover 15 is held in place by suitable fastening structure and as illustrated said cover has a wall 29 with a peripheral flange 30 extending downwardly around the upper portion of the shell side wall 25. The flange 30 has a plurality of circumferentially spaced slots 31 therein to receive clamping bolts 32. The bolts are swingably mounted on the shell 23 by pins 33 in lower ends of the bolts and pivotally mounted in bearings 34 of ears 35 fixed to the shell side wall 25 the bolts 32 have threaded upper portions 36 and clamping members such as wing nuts 37 are threaded on the bolts to engage the cover 15 and secure same on the container to close same and prevent accidental spilling of molten metal from the container.

A hand grip 39 is connected to the cover 15 and spray head 2 and extends outwardly and downwardly therefrom in spaced relation to the container shell 23. The hand grip 39 providing means for manipulating the spraying apparatus. Preferably, the hand grip 39 is made of a material having low heat conductance or can have a layer of insulation (not shown) therearound.

The spray head 2 includes a tubular member 43 secured to a mounting member 44 that preferably is integral with the cover 15 extending upwardly therefrom. The tubular member 43 has the hand grip 39 secured thereto in any suitable manner wherein a flow passage (not shown) extending through the hand grip 39 opens into the interior of the tubular member 43. A venturi 45 is suitably secured to the tubular member 43 such as by threaded engagement and extends between the tubular member 43 and a second tubular member 46, that defines the discharge passage 5, forming a flow passage therebetween. The venturi 45 has a small orifice 47 opening into the second tubular member 46 and directed toward an open end thereof. Preferably, the discharge tube member 46 is encased in a receiver 48, that is made of a material having high heat conductance, and has the venturi 45 in threaded engagement therewith for securing the discharge tube member 46 to the venturi 45. As illustrated, the exposed portions of the venturi 45 between the tube members 46 and 43 are surrounded by insulation 49 secured thereto.

A siphoning or induction tube 50 extends through the cover 15 having the lower end thereof adjacent the bottom wall 12 of the vessel 11 and an upper end extending through the receiver 48 and discharge tube 46 into the interior of the discharge tube 46 adjacent the orifice 47 in an induction area. The upper end 51 of the siphoning tube 50 preferably is cut diagonally with the edge adjacent the venturi 45 being higher having the diagonal end sloping downwardly therefrom. The siphoning tube 50 can be held in position by any suitable means such as a set screw 52 that is in threaded engagement with the receiver 48.

A conduit 54 is secured to the tubular member 43 extending upwardly therefrom and opening into the interior thereof between the hand grip 39 and the venturi 45. Preferably, the conduit 54 has a bend therein wherein the conduit extends above the receiver 48 to the spraying nozzle 7 to which it is suitably connected to form an air flow path from the tubular member 43. As illustrated, the conduit 54 has an end 55 that is Y-shaped dividing it into two air flow passages each communicating with an annular flow passage 57 in the spray nozzle 7 preferably on opposite sides thereof. The spray orifices 10 open into the annular flow passage 57 and are directed at an angle relative to the longitudinal axis of the tube 46 for a purpose later described. The spray nozzle 7 has an opening 58 therethrough with the discharge passage 5 directed axially therethrough, the opening 58 being partially defined by a chamfered surface portion 59. The spray orifices 10 are spaced circumferentially about the opening 58 and open onto the surface 59 and are directed away from the spraying nozzle 7 toward a point spaced in front of the spraying nozzle 7 in line with the axis of the discharge passage 5. Preferably, both the conduit 54 and the tubular member 43 have insulation 61 and 62 respectively covering the exposed surfaces thereof.

The conduit 54 is suitably heated by the heater 9 and extends through an upper portion 64 of the receiver 48 that preferably has insulation 65 therearound to prevent heat loss. The heater 9 includes heating elements 66 that are mounted in the upper portion 64 around the conduit 54 and are operable for supplying heat thereto. As illustrated, the heating elements are electrically insulated rod type heaters having a conductor 67 for electrical connection. It is to be noted that other types of electrical heaters can be used to supply heat to air that flows through the conduit 54. Spacing leg members 69 extend between and connect the upper portion 64 to the remainder of the receiver 48 and are operable to transfer heat from the upper portion 64 to the tube 46.

Air from a pressurized source is supplied to the spraying apparatus 1 through a flexible conduit 71 after flowing through a suitable air heater 72. As illustrated, the conduit 71 is connected to the hand grip 39 to flow through the flow passage therein and into the tubular member 43. A suitable valve (not shown) is mounted in the hand grip 39 for controlling the flow of hot air therethrough, the valve being actuated by a lever 73 that is pivotally mounted on the hand grip 39. The hot air flows through the tubular member 43 into the venturi 45 and the conduit 54. The hot air flowing through the conduit 54 is further heated or super-heated by the heater 9 preferably to a temperature above the melting point of the metal to be sprayed, this requires that heaters 66 heat the conduit 54 to a very high temperature to supply adequate heat to the air flowing therethrough.

The present invention is more fully understood by description of the operation thereof. The container 3 is removed from the cover 15 and either solid metal or molten metal is placed therein. If solid metal is used, it would first be heated to a molten state before the container 3 is secured to the cover 15. Having the metal or metal alloy molten permits the siphoning tube 50 to enter the container 3 with a minimum of resistance and preferably the bottom of the siphoning tube 50 is positioned adjacent to the bottom wall 12 of the vessel 11 so as to be in the hottest part of the molten metal. The heaters 20, 66 and 72 can be connected to suitable temperature control means such as rheostats and should be at the desired operating temperature before operation of the spraying apparatus 1. With the heaters 20, 66 and 72 at operating temperature, the operator grasps the handle 39 to hold the spraying apparatus 1. He then directs the spraying apparatus 1 at the surface to be coated with the molten metal or metal alloy and by depressing the lever 73 air flows through the handle 39 into the tubular member 43 and the venturi 45. The air flowing through the venturi 45 has an increase in velocity by flowing through the orifice 47 and is directed over the end 51 of the siphon tube 50. Because the end 51 is cut diagonally and positioned as described above, a negative pressure is created by the air flowing thereover thereby siphoning the molten metal or metal alloy from container 3 and into the discharge passage 5 wherein the air carries a stream of the molten metal in the shape of small particles or drops through the heated discharge passage 5 toward the spraying nozzle 7. Preferably, the tube 46 is of a material that the molten metal or metal alloy will not adhere thereto. Upon siphoning of the metal from the container 3 the pressure therein would be reduced sufficiently so that no more metal could be siphoned therefrom. A pressure equalizing port 75 is provided in the cover 15 so that the pressure inside the vessel 11 is substantially equal to the atmospheric pressure. The port 75 also prevents excessive pressure buildup in the vessel 11 reducing the possibility of it exploding. It is to be noted that a suitable valve could be installed in the port 75 to prevent flow of molten metal therethrough if the spraying apparatus 1 were accidentally turned over. When the molten metal reaches the spraying nozzle 7, the heated air flowing through the conduit 54 and the spray orifices 10 is of a sufficient flow rate and velocity to further atomize the stream of molten metal by impinging on same. With the spray orifices 10 directed as described above, the air flowing through the spray orifices 10 and the venturi 45 will propel the atomized molten metal toward the surface to be sprayed. The use of heated air is desired so that the molten metal will not solidify before it reaches the surface to be coated. The heating of the tube 46 by the heaters 66 also prevents the molten metal from solidifying on the walls thereof. The spraying apparatus 1 is particularly applicable for use with metals that have low melting temperatures such as lead and lead alloys and in particularly applicable for spraying such alloys onto vehicle surfaces such as fenders that have been damaged.

It is to be understood that while I have illustrated and described certain forms of my invention, it is not to be limited to the specific form or arrangement of parts shown and described herein.

What I claim and desire to secure by Letters Patent is:

1. A molten metal spraying apparatus comprising:
   a. a container having an insulated vessel therein forming a chamber to receive metal material to be reduced to a molten state;
   b. a heater in said container in heat transfer relation to lower part of said vessel and operative to melt said material and maintain same in a molten state;
   c. a spray head having an induction area with a discharge passage;
   d. an induction tube on said spray head and extending from an open end in said induction area to adjacent the bottom of the vessel chamber and communicating said chamber with said induction area;
   e. an air duct connected to a hot air supply and having a control for selective delivery of hot air under pressure to the spray head;
   f. a venturi member in said spray head receiving said hot air and directing same at high velocity across said tube open end in the induction area to siphon molten material from said chamber and propel same in a stream of dispensed particles through said discharge passage;
   g. means directing a plurality of high velocity jets of air having a temperature above the melting point of said metal material in impinging relation into said stream of dispensed particles to atomize and heat same whereby the material is discharged in a spray of atomized molten material.

2. A molten metal spraying apparatus as set forth in claim 1 wherein said air jet directing means includes:
   a. a spray nozzle having an opening aligned with said discharge passage for discharge of said molten material particles therethrough;
   b. a second air passage in the spray head and connected to said hot air supply;
   c. heating means operative to heat air in said second passage.

3. A molten metal spraying apparatus as set forth in claim 2 wherein:

a. said spray nozzle has an annular member with an annular passage therein connected to said second passage to receive hot air therefrom;
   b. said annular member has a plurality of circumferentially spaced jet apertures communicating with said annular passage and angled inwardly and toward the direction of spray discharge whereby jets of hot air intersect the stream of dispensed particles from the discharge passage.

4. A molten metal spraying apparatus as set forth in claim 1 and including:
   a. a hand grip;
   b. means connecting said hand grip to the spray head to support same and the container therefrom;
   c. said air duct extending through said hand grip;
   d. said control is a valve in the hand grip and a pivoted lever extending therefrom for operation by the hand of a person holding the hand grip.

5. A molten metal spraying apparatus as set forth in claim 1 wherein:
   a. said heater in the container is a receiver of high thermal conductivity having a surface in heat transfer contact with substantially all of a bottom wall of the vessel, an electrically insulated electric heating element in said receiver and connected to a source of electrical energy to heat the bottom of the vessel and melt metal material in said vessel;
   b. said induction tube having an open lower end adjacent said vessel bottom wall where the molten material has the highest temperature.

6. A molten metal spraying apparatus as set forth in claim 5 wherein:
   a. said spray head has a portion with the induction area and discharge passage therein and is of a material having high heat conductivity;
   b. said high velocity air jet directing means having air passage means connected to said air duct and receiving air under pressure therefrom;
   c. a second heater means in heat transfer contact to said air passage means and operative to heat air passing therethrough to a temperature above the melting point of said metal material;
   d. said second heater means and air passage means being in heat conductive relation to said spray head portion to heat same and the discharge passage therein.

7. A molten metal spraying apparatus as set forth in claim 6 wherein:
   a. a spray nozzle having an opening aligned with said discharge passage for discharge of said molten material particles therethrough;
   b. a second air passage in the spray head and connected to said hot air supply;
   c. heating means operative to heat air in said second passage.

8. A molten metal spraying apparatus as set forth in claim 7 and including:
   a hand grip;
   b. means connecting said hand grip to the spray head to support same and the container therefrom;
   c. said air duct extending through said hand grip;
   d. said control is a valve in the hand grip and a pivoted lever extending therefrom for operation by the hand of a person holding the hand grip.

9. A molten metal spraying apparatus as set forth in claim 8 wherein:

a. said spray nozzle has an annular member with an annular passage therein connected to said second passage to receive hot air therefrom;

b. said annular member has a plurality of circumferentially spaced jet apertures communicating with said annular passage and angled inwardly and toward the direction of spray discharge whereby jets of hot air intersect the stream of dispensed particles from the discharge passage.

10. A molten metal spraying apparatus comprising:

a. a container having an insulated chamber therein for receiving metal material to be melted;

b. means heating said metal material and maintaining same melted in the chamber;

c. spray head having a connection to a source of high pressure hot air and a discharge passage and a venturi directing said hot air in a high velocity stream into said passage;

d. means effecting flow of molten material from said chamber to said discharge passage in resonse to said high velocity air stream, said air stream dispensing the molten material in minute particles and discharging same from said passage;

e. a second heater associated with said spray head to heat same;

f. means directing hot air in heat transfer relation to said second heater and jetting same into the molten metal directed from said discharge passage to atomize same, said jetted air being of a temperature above the melting point of said metal material.

* * * * *